United States Patent
Stokholm et al.

(10) Patent No.: US 7,606,043 B2
(45) Date of Patent: Oct. 20, 2009

(54) ROCKER KEY IN A PORTABLE ELECTRONIC DEVICE

(75) Inventors: Dan Stokholm, Valby (DK); Aki Laine, Kobenhavn S (DK); Christopher Scales, Kobenhvn O (DK)

(73) Assignee: Nokia Corporation, Espoo (FI)

( * ) Notice: Subject to any disclaimer, the term of this patent is extended or adjusted under 35 U.S.C. 154(b) by 114 days.

(21) Appl. No.: 11/477,512

(22) Filed: Jun. 28, 2006

(65) Prior Publication Data

US 2008/0002376 A1    Jan. 3, 2008

(51) Int. Cl.
*H05K 5/00* (2006.01)

(52) U.S. Cl. ........................ 361/752; 361/683; 361/755; 455/575

(58) Field of Classification Search .................... 379/38; 455/550.1, 575.4, 90, 575.1, 575.2, 575.3, 455/90.3, 575; 361/683, 755, 752; 200/5 R, 200/6 A, 18, 296, 338, 339
See application file for complete search history.

(56) References Cited

U.S. PATENT DOCUMENTS

| | | | | |
|---|---|---|---|---|
| 5,151,946 | A * | 9/1992 | Martensson | 455/575.4 |
| 6,571,086 | B1 * | 5/2003 | Uusimaki | 455/90.3 |
| 6,643,529 | B1 * | 11/2003 | Inoue et al. | 455/575.4 |
| 6,785,565 | B2 * | 8/2004 | Gventer | 455/575.4 |
| 7,092,495 | B2 * | 8/2006 | Kraft et al. | 379/88.11 |
| 7,105,762 | B1 * | 9/2006 | Lee | 200/449 |
| 7,181,257 | B2 * | 2/2007 | Gordecki | 455/575.4 |
| 7,428,430 | B2 * | 9/2008 | Ahn et al. | 455/575.4 |
| 2002/0044425 | A1 * | 4/2002 | Ijas et al. | 361/724 |
| 2002/0132633 | A1 * | 9/2002 | Johnson et al. | 455/550 |
| 2003/0022633 | A1 * | 1/2003 | Chen | 455/90 |
| 2004/0005908 | A1 * | 1/2004 | Crisp | 455/550.1 |
| 2004/0204001 | A1 * | 10/2004 | Chen et al. | 455/550.1 |

OTHER PUBLICATIONS

Nokia.com web site with pictures of Nokia 8801 phone, 8 pages.

* cited by examiner

*Primary Examiner*—Dean A. Reichard
*Assistant Examiner*—Andargie M Aychillhum
(74) *Attorney, Agent, or Firm*—Harrington & Smith, PC

(57) ABSTRACT

A hand-held, portable electronic device including a housing, electronic circuitry in the housing and a rocker key. The housing includes a first section and a second section. The second section is longitudinally slideably mounted on the first section along a longitudinal axis. The rocker key is pivotably connected to the second section of the housing. The rocker key includes a one-piece member with a rotational axis generally aligned with the longitudinal axis.

18 Claims, 5 Drawing Sheets

ROCKER KEY IN A PORTABLE ELECTRONIC DEVICE

BACKGROUND OF THE INVENTION

1. Field of the Invention

The invention relates to a user interface in a portable electronic device and, more particularly, to a rocker key arrangement.

2. Brief Description of Prior Developments

Nokia Corporation of Espoo, Finland sells an 8801 Model telephone which has a housing with two slideable sections. Two soft keys are, located below the display which are adapted to select different functions based upon an operation state of the telephone. A stationary push-up section of the housing is located between the two soft keys to allow a user to push up on the push-up section to slide the two slideable sections apart from a collapsed or retracted position.

Handheld communication devices are quite popular, especially, handheld communications devices such as wireless mobile telephones. Smaller sized devices are sought after by the consumer market. Developers of handheld devices are faced with the task of providing smaller sized devices with ergonomic, esthetic enhancements to selective consumers. Consumers want larger displays and easy to use input components in their handheld devices. Further, consumers often are drawn to handheld devices that have a carrying case or holster.

There is a need for reliable, functional input components in a handheld device.

SUMMARY OF THE INVENTION

In accordance with one aspect of the invention, a hand-held, portable electronic device is provided including a housing, electronic circuitry in the housing and a rocker key. The housing includes a first section and a second section. The second section is longitudinally slideably mounted on the first section along a longitudinal axis. The rocker key is pivotably connected to the second section of the housing. The rocker key includes a one-piece member with a rotational axis generally aligned with the longitudinal axis.

In accordance with another aspect of the invention, a hand-held, portable electronic device is provided comprising a housing, electronic circuitry in the housing, and a rocker key. The housing comprises a first section and a second section. The second section is longitudinally slideably mounted on the first section along a longitudinal axis. The rocker key is pivotably mounted to the second section of the housing. The rocker key comprises a one-piece member extending across a majority of a width of the housing.

In accordance with another aspect of the invention, a hand-held, portable electronic device is provided comprising a housing, electronic circuitry in the housing, and a rocker key. The housing comprises a first section and a second section. The second section is longitudinally slideably mounted on the first section along a longitudinal axis. The rocker key is pivotably mounted to the second section of the housing by a connection. The connection comprises a spring member having a middle section connected to a middle section of the rocker key and two opposite ends connected to the second section of the housing.

In accordance with another aspect of the invention, a hand-held, portable electronic device soft key is provided comprising a center section and two end sections. The center section has a rear side with a pivot area, and a front side and bottom side with a finger groove at a junction of the front and bottom sides. The pivot area is adapted to allow the key to rock on another member as a rocker key. The two end sections are on opposite lateral sides of the center section. Each end section forms a soft key area adapted to be alternatively depressed to respectively activate two spaced soft key function switches of a hand-held, portable electronic device located beneath the two soft key areas.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
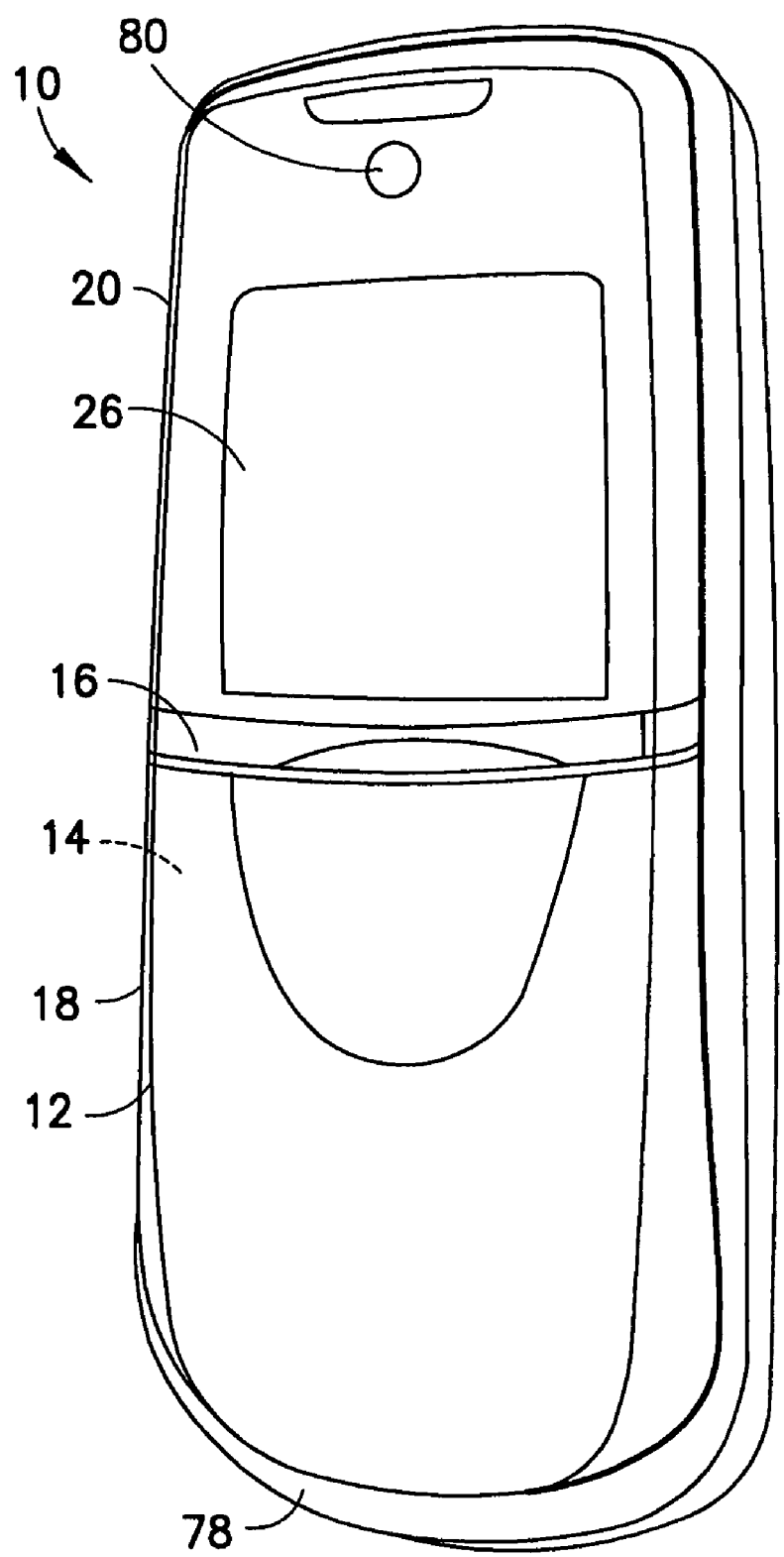
FIG. 1 is a perspective view of a hand-held, portable mobile telephone incorporating features of the invention.

Referring to FIG. 1, there is shown a perspective view of hand-held, portable electronic device 10 incorporating features of the invention. Although the invention will be described with reference to the exemplary embodiment shown in the drawings, it should be understood that the invention can be embodied in many alternate forms of embodiments. In addition, any suitable size, shape or type of elements or materials can be used.

The device 10 in this embodiment is a mobile telephone. However, in alternate embodiments, features of the invention could be used in any suitable hand-held, portable electronic device including, for example, a PDA, a gaming device, a communicator, a music player, etc. The device 10 generally comprises a housing 12, electronic circuitry 14 inside the housing, and a user interface (UI) 16. The electronic circuitry 14 generally comprises conventional mobile telephone circuitry. The housing 12 generally comprises a first section 18 and a second section 20. The second section 20 is longitudinally slideably mounted to the first section 18.

Figure 2:
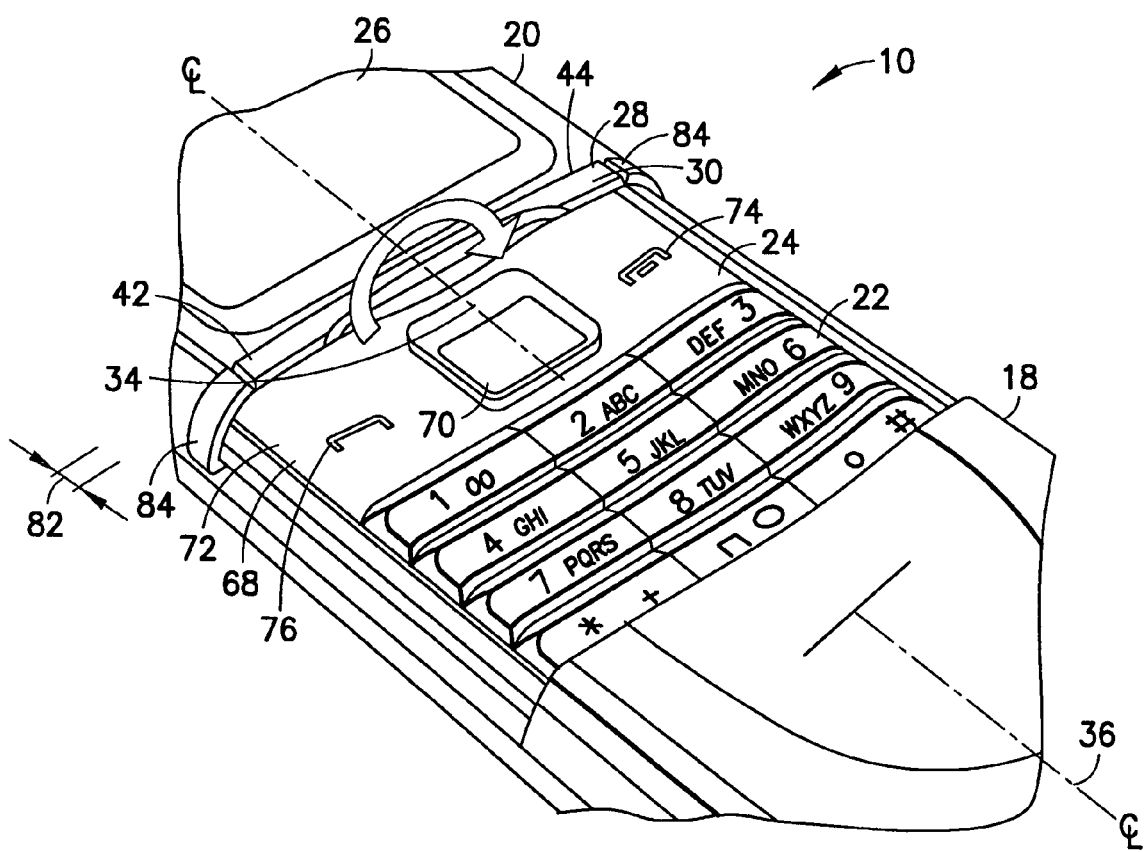
FIG. 2 is an enlarged, partial perspective view of the telephone shown in FIG. 1 at a partially expanded position.

FIG. 1 shows the first and second sections 18, 20 in a collapsed or non-extended position. FIG. 2 shows the second section 20 moved upward relative to the first section 18 to an expanded or extended position on the first section 18. The second section 20 is slideably extendable and retractable relative to the first section 18 along a longitudinal axis 36. The second section 20 comprises a keypad 22, control keys 24 and a display 26 of the electronic circuitry 14. When the second section 20 is in the collapsed position, as shown in FIG. 1, the keypad 22 and control keys 24 are housed inside the first section 18. However, as shown in FIG. 2, when the second section 20 is slid upward relative to the first section 18, the keypad 22 and control keys 24 are moved up to be exposed and allow the user access to those features. The user interface 16 includes the display 26, the keypad 22, the control keys 24, a soft key feature 28, a microphone 78 and a speaker or sound transducer 80. Additional or alternative features could also be provided.

Referring also to FIGS. 3A-3E, in this embodiment the soft key feature 28 comprises a rocker key 30 movably mounted to a housing member 32 of the second section 20. The rocker key 30 comprises a one-piece member 40 with a rotational axis or pivot axis 34 at its middle section 38 generally aligned with the longitudinal axis 36; perhaps slightly forward of the longitudinal axis 36. The one-piece member 40 extends across a majority of a width of the housing, and has a substantially thin height 82. In the embodiment shown the one-piece member 40 extends across about 90 percent of the width of the housing. Because the key 30 is a rocker key, it provides two alternatively depressible key areas 42, 44 at its opposite ends. These two key areas 42, 44 can be used to actuate switches or sensors beneath the key areas such that the rocker key forms two soft keys (one at area 42 and one at area 44) adapted to select or activate different functions based upon an operational state of the device 10. The rocker key 30 moves up and down with the up and down sliding positioning of the second section 20.

Referring also to FIGS. 4A-4G, the one-piece member 40 generally comprises a front side 46, a bottom side 48 and a rear side 50. The front side 46 forms the areas 42, 44 as surfaces for a user's finger to actuate the rocker key 30. The bottom side 48 generally faces in a direction towards the keypad 22 and control keys 24. Located at a junction of the front side 46 and the bottom side 48 is a finger groove 52. As can be seen in FIG. 1, the rocker key 30 is exposed when the housing is in a collapsed position. The finger groove 52 provides an ergonomic shape for a user finger, such as a thumb for example, to push up on the second section 20 to, at least initially, separate the second section 20 from the first section 18 when expanding the housing to its expanded position. Thus, the one-piece member 40, in addition to providing the two soft key function areas 42, 44, also provides a push-up detail for, at least initially, separating the two sections 18, 20. This reduces the number of parts and assembly steps compared to the Nokia Model 8801 telephone noted above.

Figure 3A:
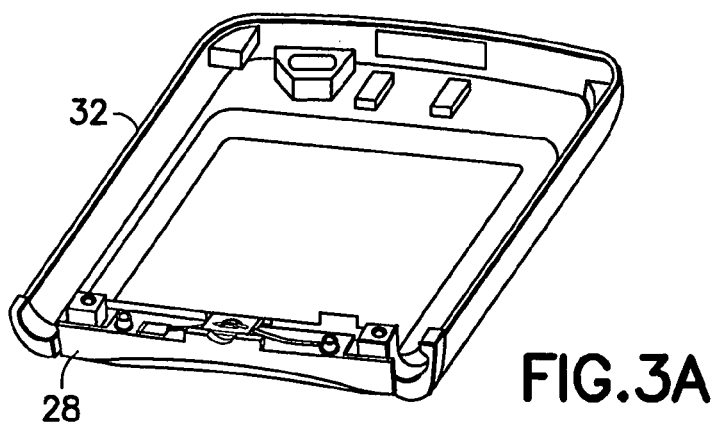
FIG. 3A is a rear perspective view of some of the components of the second section of the telephone shown in FIG. 2.
Figure 3B:
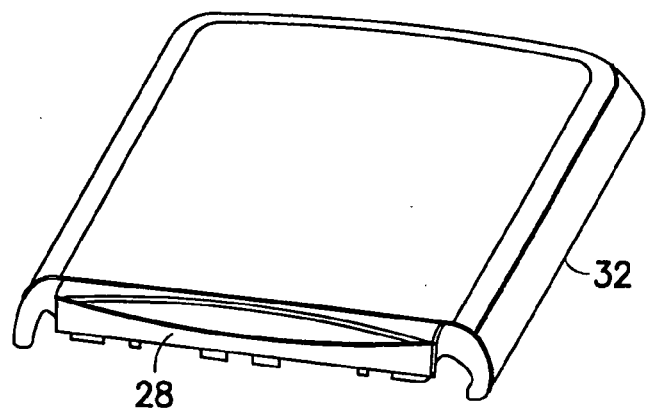
FIG. 3B is a front perspective view of the components shown in FIG. 3A.
Figure 3C:
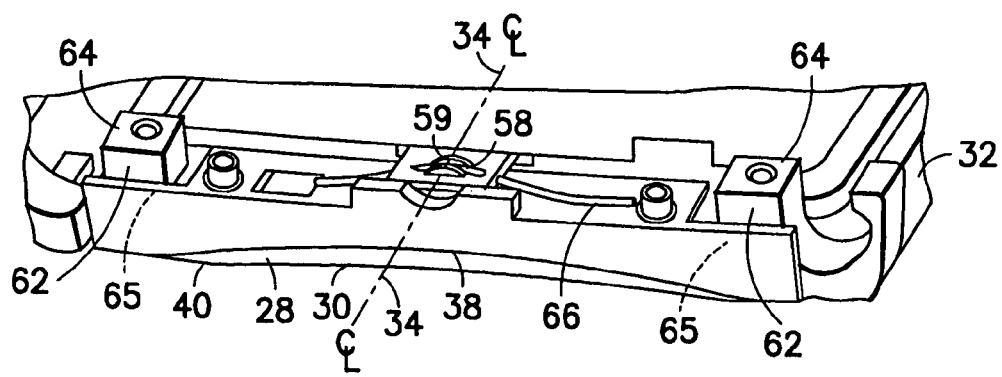
FIG. 3C is an enlarged perspective view of a portion of the components shown in FIG. 3A.
Figure 3D:
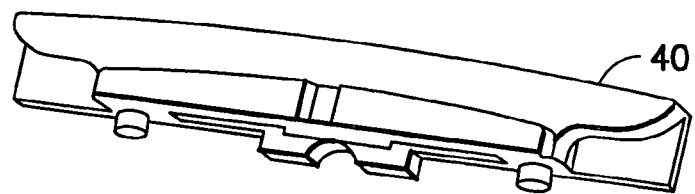
FIG. 3D is a bottom and rear perspective view of the one-piece member of the rocker key shown in FIGS. 3A and 3C.
Figure 3E:
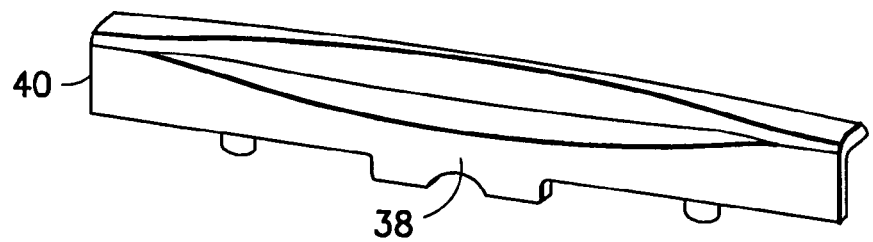
FIG. 3E is a bottom and front perspective view of the one-piece member shown in FIG. 3D.
Figure 4A:
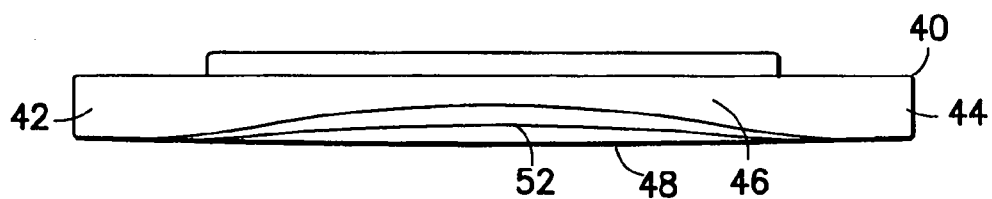
FIG. 4A is a front side view of the one-piece member shown in FIG. 3D.
Figure 4B:
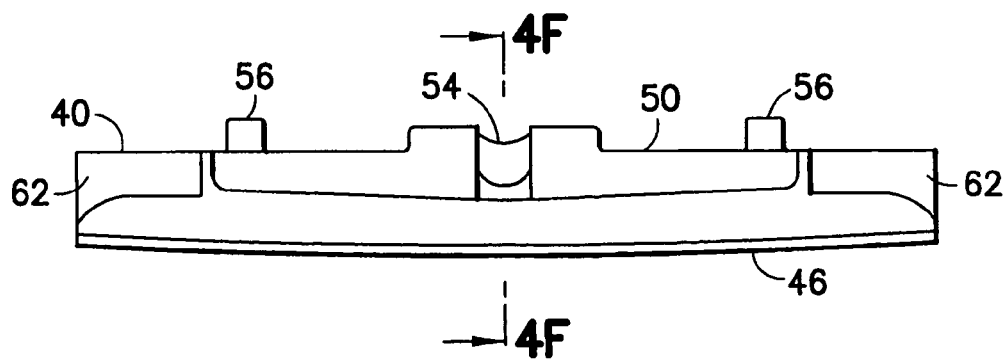
FIG. 4B is a top side view of the one-piece member shown in FIG. 3D.
Figure 4C:
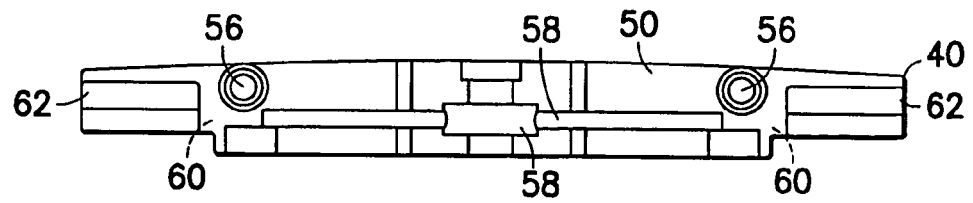
FIG. 4C is a rear side view of the one-piece member shown in FIG. 3D.
Figure 4D:
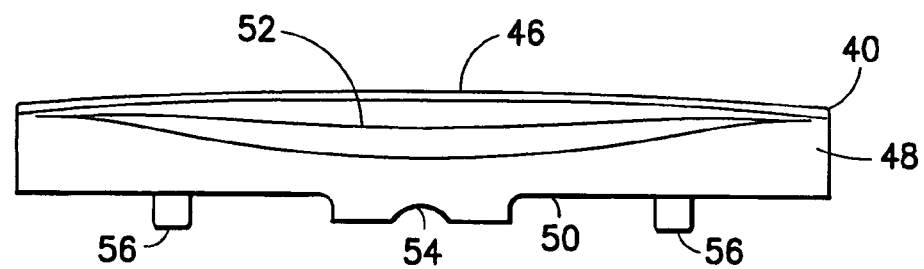
FIG. 4D is a bottom side view of the one-piece member shown in FIG. 3D.
Figure 4E:
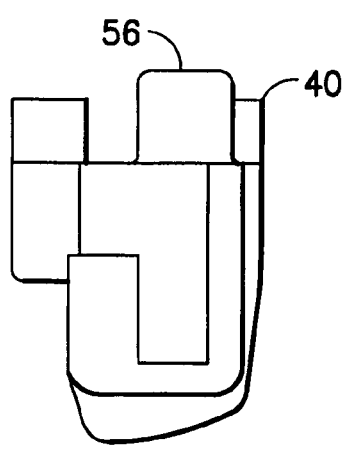
FIG. 4E is a left side view of the one-piece member shown in FIG. 3D.
Figure 4F:
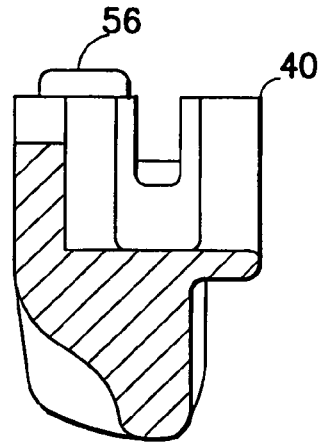
FIG. 4F is a cross sectional view of the one-piece member shown in FIG. 4B taken along line 4F-4F.
Figure 4G:
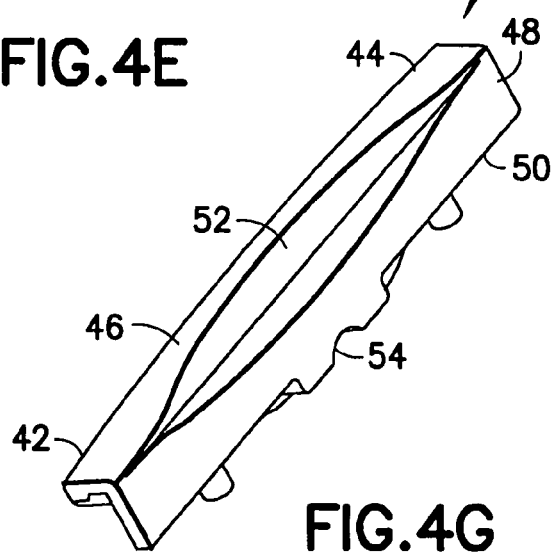
FIG. 4G is a perspective view of the one-piece member shown in FIG. 3D.

The rear side 50 of the one-piece member 40 has a pivot area 54 at the middle section of the member. The rear side also comprises posts 56 located at opposite sides of the pivot area; one post beneath each of the areas 42, 44. The post 56 are adapted to actuate the sensors or switches of the electronic circuitry when the areas 42, 44 are respectively depressed. The rear side 50 also comprises a connector mount comprising a recess 58 at the middle section of the member 40, and holes 60 extending into opposite end slots 62. As seen in FIG. 3C, portions 64 of the housing member 32 of the second section 20 are received in the slots 62. The portions 64 have holes 65 facing toward each other. Connection of the member 40 to the housing of the second section 20 includes a wire spring 66. The wire spring 66 has opposite ends which extend through the holes 60 and into the holes 65. The middle section of the wire spring 66 is located in the recess 58 of the member 40 against a portion 59 of the housing member 32. Thus, the spring 66 cooperates with the housing member 32 of the second section 20 to movably mount the member 40 to the second section 20 such that the rocker key 30 can rock between its two depressible areas 42, 44. The spring 66 can help to bias the member 40 in a home position with neither area 42, 44 depressed.

Referring back to FIG. 2, one of the features of the invention is that the send/end key feature 68 and the navigation key feature 70 of the control keys 24 is made larger than in the Nokia Model 8801 telephone. The send/end key feature 68 is located on the second section 20 and comprises a one-piece control key 72 between the rocker key 30 and the keypad 22. The device, in this embodiment, is a radio communications device such that the one-piece control key 72 provides an end, on-hook feature at a first end or area 74 of the and a send, off-hook feature at a second opposite end or area 76. The navigation key feature 70 is located between the two areas 74, 76. Unlike the Nokia Model 8801 telephone the send/end key feature is preferably made with a one-piece, sheet metal part; as opposed to the conventional two separate keys. The one-piece, sheet metal part could be a rocker key or could be deflectable portions of a resiliently deforming metal member. The soft key feature 28 is made thinner in height 82 than in the conventional two soft key Nokia Model 8801 telephone, and thereby gives more space to enlarge the send/end key feature 68 and/or the navigation key feature 70 without increasing the footprint or overall size of the device.

One feature of the invention is that the soft key feature 28 is comprises of a one-piece member that provides two soft key features; pivoting over the center of the one-piece member 40 in a rocker switch style of movement. In addition, the center of the one-piece soft key feature is not only used as a pivot point for the rocking key, but also as a push-up area at groove 52 for a user to push the two section 18, 20 apart. The groove 52 slides up the phone from the closed positioning as the housing sections 18, 20 are moved to their extended position. The soft key is part of the UI cover assembly. The soft key is constrained to the UI cover. The constraints are made from the ornamental detail parts 84 of the housing member 32 of the second section 20 and the center pivot connection; as well as the wire spring connection to keep the soft key 30 in place.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
   a housing comprising a first section and a second section, wherein the second section is longitudinally slideably mounted on the first section along a longitudinal axis;
   electronic circuitry in the housing; and
   a rocker key pivotably connected to the second section of the housing, wherein the rocker key comprises a one-piece member with a rotational axis generally aligned with the longitudinal axis,
   wherein the rocker key is pivotably mounted to the second section of the housing by a connection, wherein the connection comprises a spring member having a middle section connected to a middle section of the rocker key and two opposite ends connected to the second section of the housing.

2. An apparatus as in claim 1 wherein the rocker key comprises a finger groove along a front, bottom side of the rocker key at the middle section of the rocker key.

3. An apparatus as in claim 1 wherein the one-piece member extends across a majority of a width of the housing.

4. An apparatus as in claim 1 wherein the second section comprises a keypad and a display.

5. An apparatus as in claim 4 wherein the rocker key is located between the keypad and the display.

6. An apparatus comprising:
a housing comprising a first section and a second section, wherein the second section is longitudinally slideably mounted on the first section along a longitudinal axis;
electronic circuitry in the housing; and
a rocker key pivotably connected to the second section of the housing, wherein the rocker key comprises a one-piece member with a rotational axis generally aligned with the longitudinal axis,
wherein the second section comprises a keypad and a display, wherein the second section comprises a control key between the rocker key and the keypad, wherein the control key comprises a second rocker key comprising a one-piece member.

7. An apparatus as in claim 6 wherein the apparatus is a hand-held, portable electronic radio communications device, wherein the second rocker key provides an end, on-hook feature at a first end of the second rocker key and a send, off-hook feature at a second opposite end of the second rocker key.

8. An apparatus comprising:
a housing comprising a first section and a second section, wherein the second section is longitudinally slideably mounted on the first section along a longitudinal axis;
electronic circuitry in the housing; and
a rocker key pivotably mounted to the second section of the housing, wherein the rocker key comprises a one-piece member extending across a majority of a width of the housing,
wherein the rocker key is pivotably mounted to the second section of the housing by a connection, wherein the connection comprises a spring member having a middle section connected to a middle section of the rocker key and two opposite ends connected to the second section of the housing.

9. An apparatus as in claim 8 wherein the rocker key comprises a one-piece member with a pivot axis generally aligned along a center longitudinal plane of the housing.

10. An apparatus as in claim 8 wherein the rocker key comprises a finger groove along a bottom side of the rocker key at the middle section of the rocker key.

11. An apparatus as in claim 8 wherein the second section comprises a keypad and a display, and wherein the rocker key is located between the keypad and the display.

12. An apparatus as in claim 8 wherein the rocker key comprises a soft key adapted to select different functions based upon an operational state of the device.

13. An apparatus comprising:
a housing comprising a first section and a second section, wherein the second section is longitudinally slideably mounted on the first section along a longitudinal axis;
electronic circuitry in the housing; and
a rocker key pivotably mounted to the second section of the housing, wherein the rocker key comprises a one-piece member extending across a majority of a width of the housing,
wherein the second section comprises a keypad and a display, and wherein the rocker key is located between the keypad and the display,
wherein the second section comprises a control key between the rocker key and the keypad, wherein the control key comprises a second rocker key comprising a one-piece member.

14. An apparatus as in claim 13 wherein the apparatus is a hand-held, portable electronic radio communications device, wherein the second rocker key provides an end, on-hook feature at a first end of the second rocker key and a send, off-hook feature at a second opposite end of the second rocker key.

15. A hand-held, portable electronic device comprising:
a housing comprising a first section and a second section, wherein the second section is longitudinally slideably mounted on the first section along a longitudinal axis;
electronic circuitry in the housing; and
a rocker key pivotably mounted to the second section of the housing by a connection, wherein the connection comprises a spring member having a middle section connected to a middle section of the rocker key and two opposite ends connected to the second section of the housing.

16. A hand-held, portable electronic device as in claim 15 wherein the second section comprises a user interface cover assembly comprising a housing member with a display and a keypad fixedly connected thereto, and wherein the rocker key is pivotably connected to the housing member below the display.

17. A hand-held, portable electronic device as in claim 15 wherein the rocker key comprises a one-piece member extending across a majority of a width of the housing, and wherein the rocker key comprises a finger groove along a bottom side of the rocker key at a middle section of the rocker key.

18. A hand-held, portable electronic device soft key comprising:
a center section with a rear side having a pivot area, and a front side and bottom side with a finger groove at a junction of the front and bottom sides, wherein the pivot area is adapted to allow the key to rock on another member as a rocker key; and
two end sections on opposite lateral sides of the center section, wherein each end section forms a soft key area adapted to be alternatively depressed to respectively activate two spaced soft key function switches of a hand-held, portable electronic device located beneath the two soft key areas.

* * * * *